United States Patent
Weston et al.

(10) Patent No.: US 11,628,774 B2
(45) Date of Patent: Apr. 18, 2023

(54) VEHICLE DESIGN INTEGRATED SAND LADDERS

(71) Applicant: FORD GLOBAL TECHNOLOGIES, LLC, Dearborn, MI (US)

(72) Inventors: Keith Weston, Canton, MI (US); Derek Bier, Ann Arbor, MI (US); Ryan Orourke, Dearborn, MI (US); Jeffrey John Ley, Brighton, MI (US); Ian George Eickholdt, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 289 days.

(21) Appl. No.: 17/075,855

(22) Filed: Oct. 21, 2020

(65) Prior Publication Data
US 2022/0118914 A1    Apr. 21, 2022

(51) Int. Cl.
*B60R 3/00*    (2006.01)
(52) U.S. Cl.
CPC .................................. *B60R 3/002* (2013.01)
(58) Field of Classification Search
CPC ....................................................... B60R 3/002
See application file for complete search history.

(56) References Cited

U.S. PATENT DOCUMENTS

| | | | |
|---|---|---|---|
| 5,895,064 A | 4/1999 | Laubach | |
| 6,592,135 B2 | 7/2003 | Hendrix | |
| 9,963,060 B1* | 5/2018 | Vick | B60R 3/007 |
| 2002/0145265 A1* | 10/2002 | Howard | B60R 3/002 |
| | | | 238/14 |
| 2007/0138757 A1 | 6/2007 | Kuntze et al. | |
| 2008/0217077 A1* | 9/2008 | McCarthy | B60B 39/12 |
| | | | 180/9 |
| 2016/0185273 A1* | 6/2016 | Aftanas | B65G 69/30 |
| | | | 280/164.1 |

FOREIGN PATENT DOCUMENTS

WO    01/15937 A1    3/2001

\* cited by examiner

*Primary Examiner* — Bryan A Evans
(74) *Attorney, Agent, or Firm* — Vichit Chea; Carlson, Gaskey & Olds, P.C.

(57) ABSTRACT

This disclosure details motor vehicles equipped with vehicle exterior components. One or more of the vehicle exterior components can be used both for their primary function when attached to the vehicle and for use as sand ladders when removed from the vehicle. In the first configuration, the vehicle exterior components may be configured as running boards, hood vents, grill inserts, bumper inserts, tailgate inserts, and/or door beams, etc.

20 Claims, 10 Drawing Sheets

VEHICLE DESIGN INTEGRATED SAND LADDERS

TECHNICAL FIELD

This disclosure relates to removable vehicle exterior components that can be used both for their primary function when attached to the vehicle and for use as sand ladders when removed from the vehicle.

BACKGROUND

Many vehicles are equipped for off-roading usage. When off-roading on uneven surfaces, such as sand, mud, or snow, for example, the vehicle may periodically become stuck. Vehicle owners often carry sand ladders that may be positioned adjacent to a vehicle wheel for increasing the surface area and distributing tractive forces of the wheel in order to free the vehicle from the uneven surface.

SUMMARY

A vehicle assembly according to an exemplary aspect of the present disclosure includes, among other things, a vehicle exterior component and a mounting system configured for removably mounting the vehicle exterior component to a vehicle body. The mounting system includes at least one of a clamp or a latch. In a first configuration, the vehicle exterior component is configured as a running board. In a second configuration, the vehicle exterior component is configured to be used as a sand ladder.

In a further non-limiting embodiment of the foregoing vehicle assembly, the mounting system includes a first mounting assembly that interfaces with a first portion of the vehicle exterior component and a second mounting assembly that interfaces with a second portion of the vehicle exterior component.

In a further non-limiting embodiment of either of the foregoing vehicle assemblies, the first mounting assembly includes the clamp, and the clamp is received within an opening formed through the vehicle exterior component.

In a further non-limiting embodiment of any of the foregoing vehicle assemblies, the clamp includes a clamping leg configured to move into contact with a mounting bracket in response to moving a handle of the clamp.

In a further non-limiting embodiment of any of the foregoing vehicle assemblies, the second mounting assembly includes a receiving bracket mounted to an underside of the vehicle exterior component.

In a further non-limiting embodiment of any of the foregoing vehicle assemblies, the receiving bracket includes a concave recess configured to receive a post of a mounting bracket.

In a further non-limiting embodiment of any of the foregoing vehicle assemblies, the vehicle exterior component includes a plurality of traction features.

In a further non-limiting embodiment of any of the foregoing vehicle assemblies, the plurality of traction features include a combination of traction pins and grooves.

In a further non-limiting embodiment of any of the foregoing vehicle assemblies, the mounting system includes the latch, and the latch is received within a slot of a latch base.

In a further non-limiting embodiment of any of the foregoing vehicle assemblies, the latch is movably received within a groove formed through the vehicle exterior component.

In a further non-limiting embodiment of any of the foregoing vehicle assemblies, the groove includes a first section having a first width and a second section having a second width that is less than the first width.

A vehicle according to another exemplary aspect of the present disclosure includes, among other things, a vehicle body and a vehicle exterior component removably mountable to the vehicle body. In a first configuration in which the vehicle exterior component is mounted to the vehicle body, the vehicle exterior component is configured as a hood vent, a grill insert, a bumper insert, a tailgate insert, or a door beam. In a second configuration in which the vehicle exterior component is removed from the vehicle body, the vehicle exterior component is configured to be used as a sand ladder.

In a further non-limiting embodiment of the foregoing vehicle, the vehicle is a pickup truck or a sport utility vehicle (SUV).

In a further non-limiting embodiment of either of the foregoing vehicles, the vehicle body includes a hood, and the vehicle exterior component is a hood vent removably mountable to the hood.

In a further non-limiting embodiment of any of the foregoing vehicles, the vehicle body includes a grille assembly, and the vehicle exterior component is a grille insert removably mountable to the grille assembly.

In a further non-limiting embodiment of any of the foregoing vehicles, the vehicle body includes a bumper assembly, and the vehicle exterior component is a bumper insert removably mountable to the bumper assembly.

In a further non-limiting embodiment of any of the foregoing vehicles, the vehicle body includes a door assembly, and the vehicle exterior component is a door beam removably mountable to the door assembly.

In a further non-limiting embodiment of any of the foregoing vehicles, the vehicle body includes a tailgate assembly, and the vehicle exterior component is a tailgate insert removably mountable to the tailgate assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details motor vehicles equipped with vehicle exterior components. One or more of the vehicle exterior components can be used both for their primary function when attached to the vehicle and for use as sand ladders when removed from the vehicle. In the first configuration, the vehicle exterior components may be configured as running boards, hood vents, grill inserts, bumper inserts, tailgate inserts, and/or door beams, etc. These and other features of this disclosure are described in greater detail in the following paragraphs of this detailed description.

Figure 1:
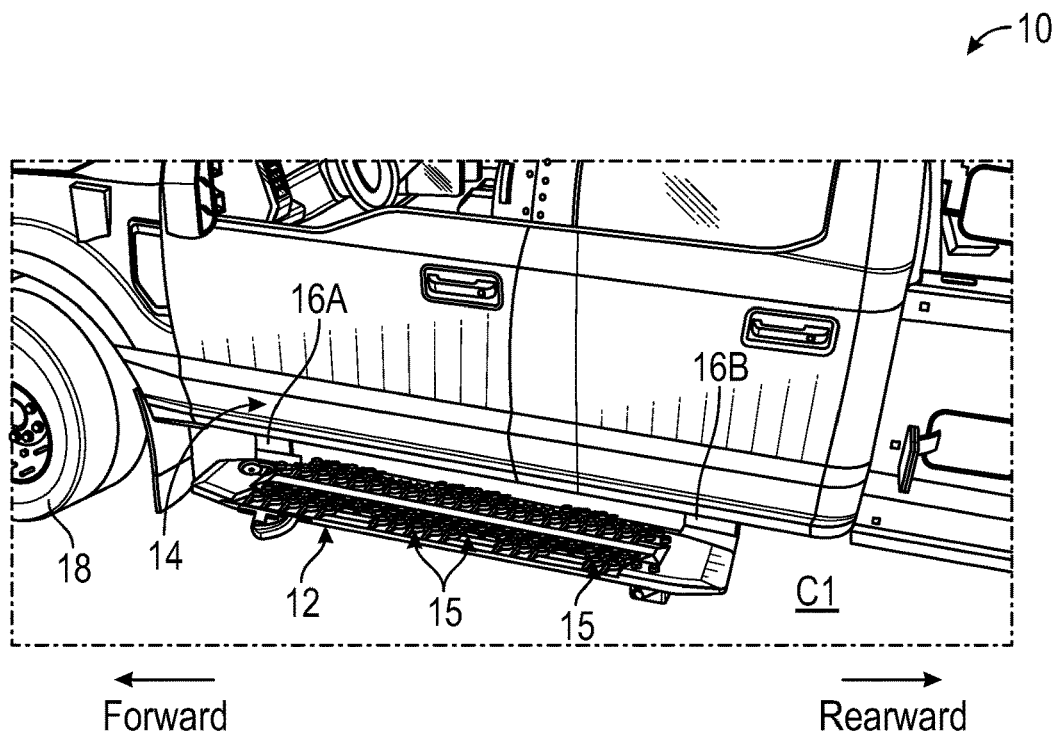
FIG. 1 illustrates a vehicle equipped with a vehicle exterior component positioned in a first configuration. In the first configuration, the vehicle exterior component is configured as a running board.

FIG. 1 schematically illustrates select portions of a motor vehicle 10. The vehicle 10 may be a pickup truck, a sport utility vehicle (SUV), a van, or any other type of vehicle having a relatively high clearance between a floor of the vehicle and the ground surface.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 may include a running board 12, which is one exemplary type of a vehicle exterior component contemplated within the scope of this disclosure. The running board 12 may be removably mounted to a vehicle body 14, which may include portions of both the frame and the paneling of the vehicle 10.

The running board 12 extends in a direction parallel to the "forward" and "rearward" directions, which are labeled in FIG. 1 and correspond to the normal "forward" and "rearward" orientations of the vehicle 10. The running board 12 may be secured relative to the vehicle 10 by fore and aft brackets 16A, 16B that are fixedly secured to the vehicle body 14. While only one running board 12 is shown in FIG. 1, it should be understood that a similar running board may be provided on an opposite side of the vehicle 10.

FIG. 1 illustrates a first configuration C1 of the running board 12. In the first configuration C1, the running board 12 is configured for its primary function (e.g., assisting vehicle passengers with entering and exiting the vehicle 10).

The owner/operator of the vehicle 10 may periodically wish to operate the vehicle 10 under off-roading conditions. When off-roading on uneven surfaces, such as sand, mud, or snow, for example, the vehicle 10 may periodically become stuck. Sand ladders, which may also be referred to as traction boards or recovery boards, are helpful for freeing the vehicle 10 from its stuck condition by increasing the surface area and distributing tractive forces of one or more wheels 18 of the vehicle 10 relative to the uneven surface. However, sand ladders are typically separate aftermarket components that must be carried and stowed within the vehicle 10, which can be cumbersome and occupy cargo space needed for other purposes. This disclosure therefore describes vehicle design integrated exterior components that can be used for both their primary purpose and a secondary purpose, such as a sand ladder.

Figure 2:
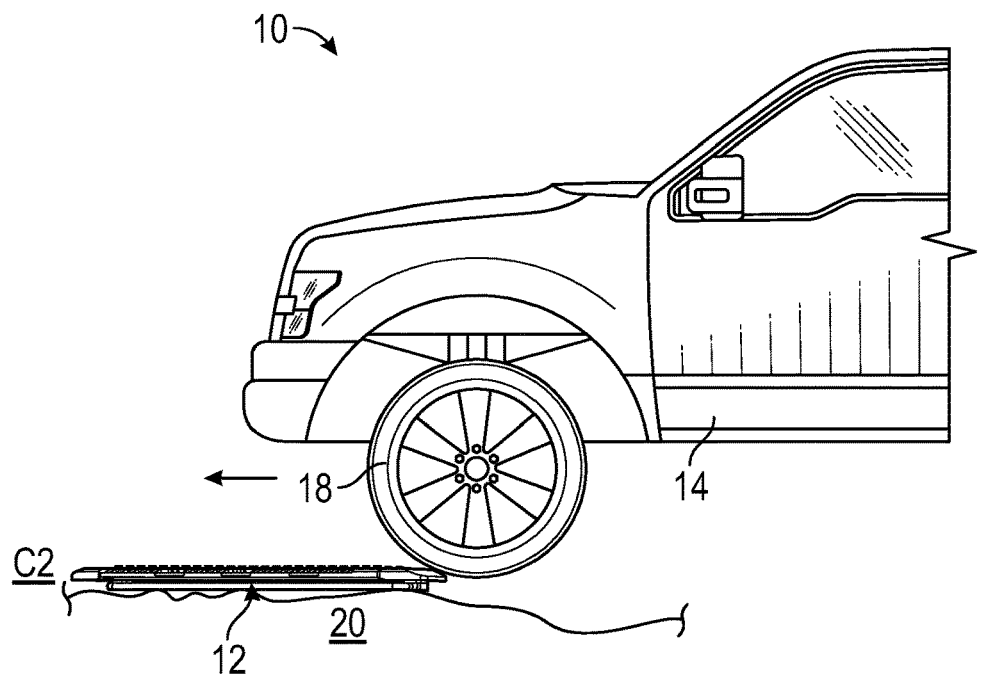
FIG. 2 illustrates a second configuration of the vehicle exterior component. In the second configuration, the vehicle exterior component is configured to be used as a sand ladder.
Figure 3:
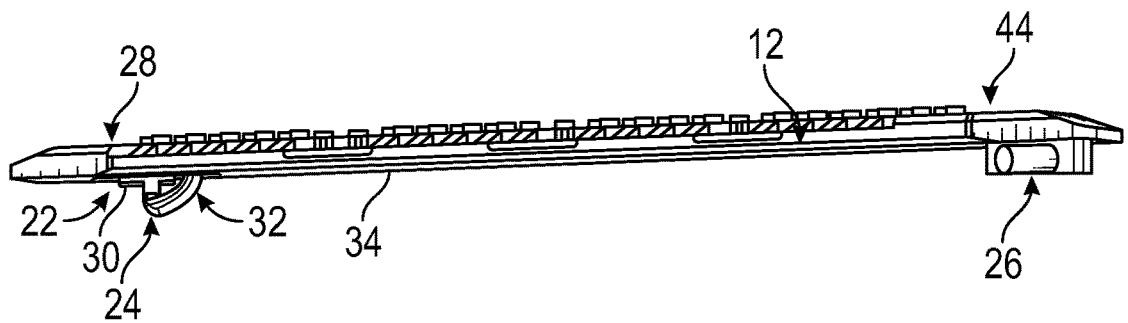
FIG. 3 illustrates an exemplary mounting system for removably mounting the vehicle exterior component of FIG. 1 to the vehicle.
Figure 4A:
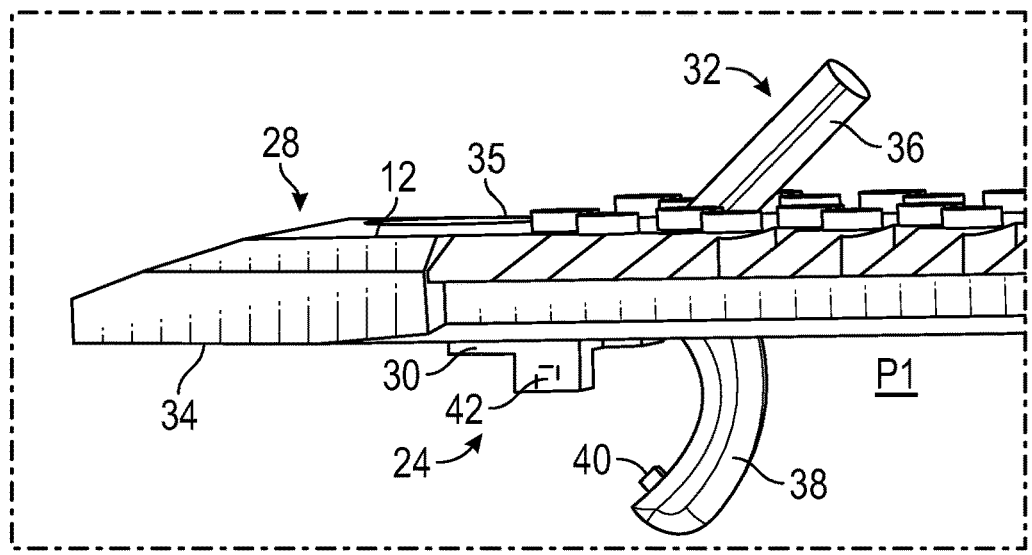
FIGS. 4A and 4B illustrate a first mounting assembly of the mounting system of FIG. 3.
Figure 4B:
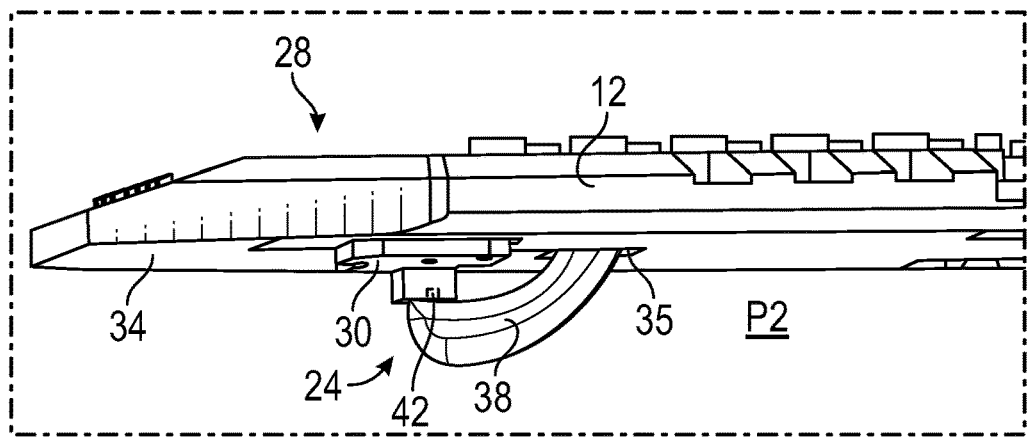
Figure 5A:
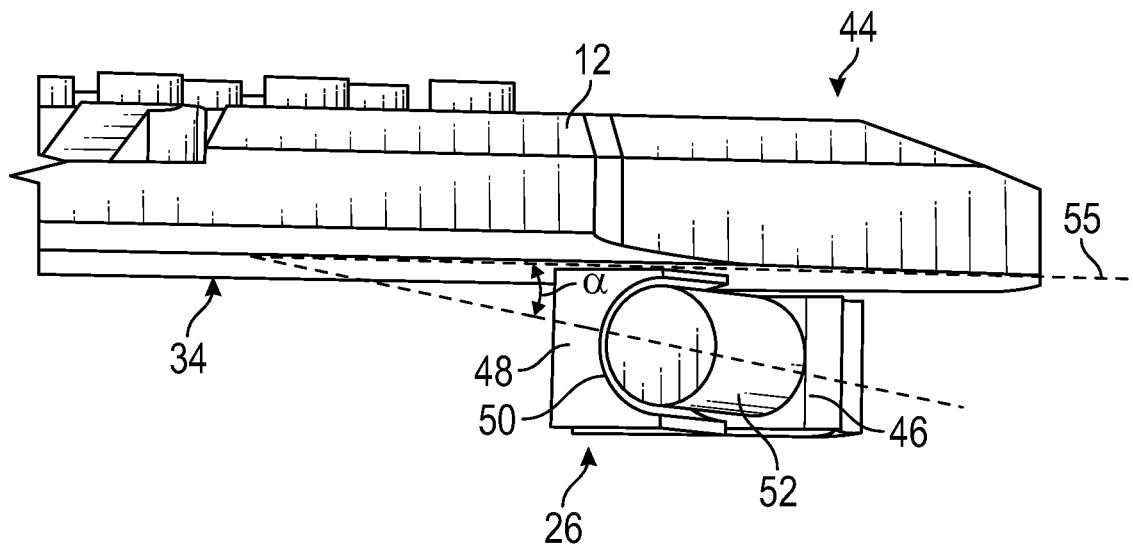
FIGS. 5A, 5B, and 5C illustrate a second mounting assembly of the mounting system of FIG. 3.
Figure 5B:
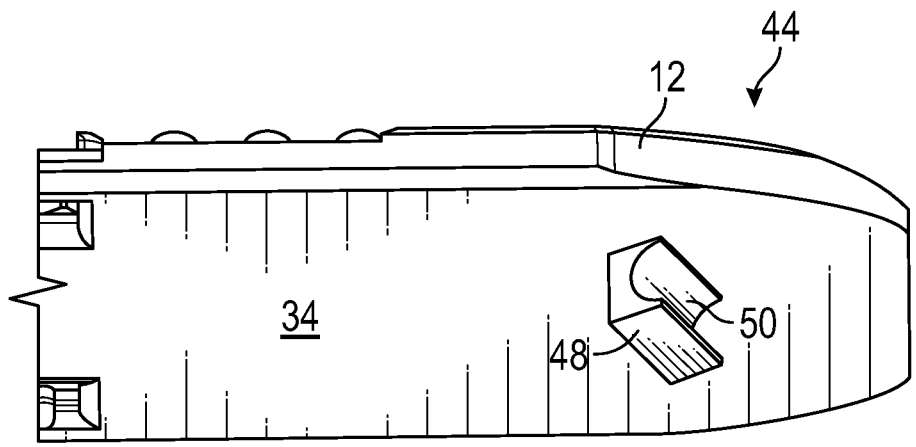
Figure 5C:
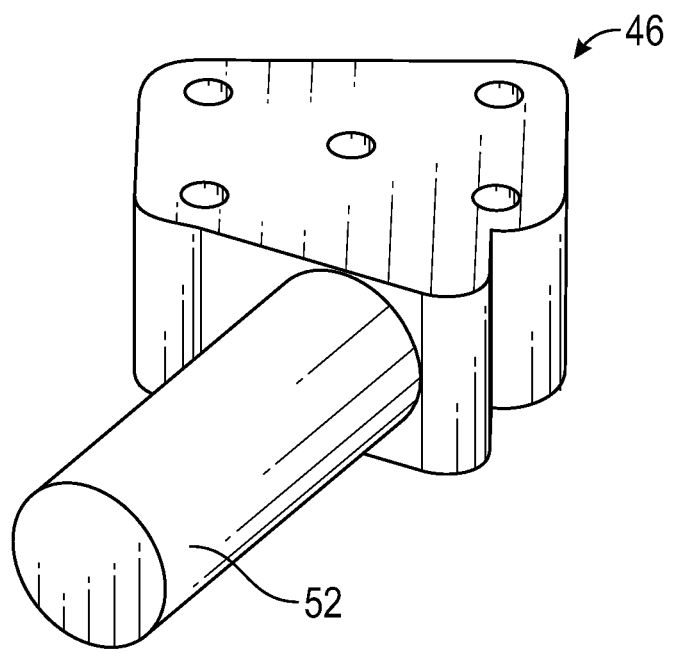

FIG. 2 illustrates a second configuration C2 of the running board 12. In the second configuration C2, the running board 12 is removed from the vehicle body 14 for use as a sand ladder. The removed running board 12 may be inserted under the wheel 18 that is stuck within an uneven surface 20. The vehicle 10 may be driven over the "sand ladder configured" running board 12 for increasing the surface area and for distributing tractive forces between the wheel 18 and the uneven surface 20.

The running board 12 may include a plurality of traction features 15 (best shown in FIG. 1) distributed across its length for increasing traction when the running board 12 is used in the second configuration C2 as the sand ladder. In an embodiment, the traction features 15 include a combination of protruding traction pins and grooves. However, the specific configuration of the traction features of the running board is not intended to limit this disclosure.

FIGS. 3-5C, with continued reference to FIG. 1, illustrate a mounting system 22 for removably mounting the running board 12 to the vehicle body 14 according to a first embodiment of this disclosure. Together, the running board 12 and the mounting system 22 establish a vehicle assembly of the vehicle 10.

In addition to the fore and aft brackets 16A, 16B shown in FIG. 1, the mounting system 22 may include a first or front mounting assembly 24 and a second or rear mounting assembly 26. The first mounting assembly 24 is further depicted in FIGS. 4A and 4B, and the second mounting assembly 26 is further depicted in FIGS. 5A, 5B, and 5C.

The first mounting assembly 24 may be positioned near a first end portion 28 of the running board 12 and is configured to interface with the fore bracket 16A of the mounting system 22. The first mounting assembly 24 may include a mounting bracket 30 and a clamp 32. The mounting bracket 30 may be fixed secured to the fore bracket 16A and is positioned at an underside 34 of the running board 12 when the running board 12 is mounted to the vehicle 10.

In an embodiment, the clamp 32 is a toggle clamp and includes a handle 36 and a clamping leg 38. The handle 36 may be received through an opening 35 formed through the running board 12 and is movable to move the clamping leg 38 between a disengaged position P1 (see FIG. 4A) and an engaged position P2 (see FIG. 4B) relative to the mounting bracket 30. In the engaged position P2, a boss 40 of the clamping leg 38 may be accommodated within a receiving opening 42 of the mounting bracket 30. The running board 12 may be removed from the vehicle body 14 when the clamp 32 is positioned in the disengaged position P1 and may be fixedly secured relative to the vehicle body 14 when the clamp 32 is moved to the engaged position P2.

The second mounting assembly 26 may be positioned near a second end portion 44 of the running board 12 and is configured to interface with the aft bracket 16B. The second mounting assembly 26 may include a mounting bracket 46 and a receiving bracket 48. The mounting bracket 46 may be fixedly secured to the aft bracket 16B and is positioned at the underside 34 of the running board 12 when the running board 12 is mounted to the vehicle 10. The receiving bracket 48 may be fixedly secured to the underside 34 and includes a concave recess 50 sized to receive a post 52 of the mounting bracket 46.

The concave recess 50 and the post 52 may be slightly angled relative to a horizontal axis 55 of the vehicle 10. In an embodiment, the concave recess 50 and the post 52 extend at an acute angle a (see FIG. 5A) relative to the horizontal axis 55. The acute angle a may be about 45°, although other angles may be suitable. In this disclosure, the term "about" means that the expressed quantities or ranges need not be exact but may be approximated and/or larger or smaller, reflecting acceptable tolerances, conversion factors, measurement error, etc. The acute angle a allows users to more easily disengage the second end portion 44 of the running board 12 from the mounting bracket 46 when removing the running board 12 from the vehicle 10 for use as a sand ladder.

Figure 6A:
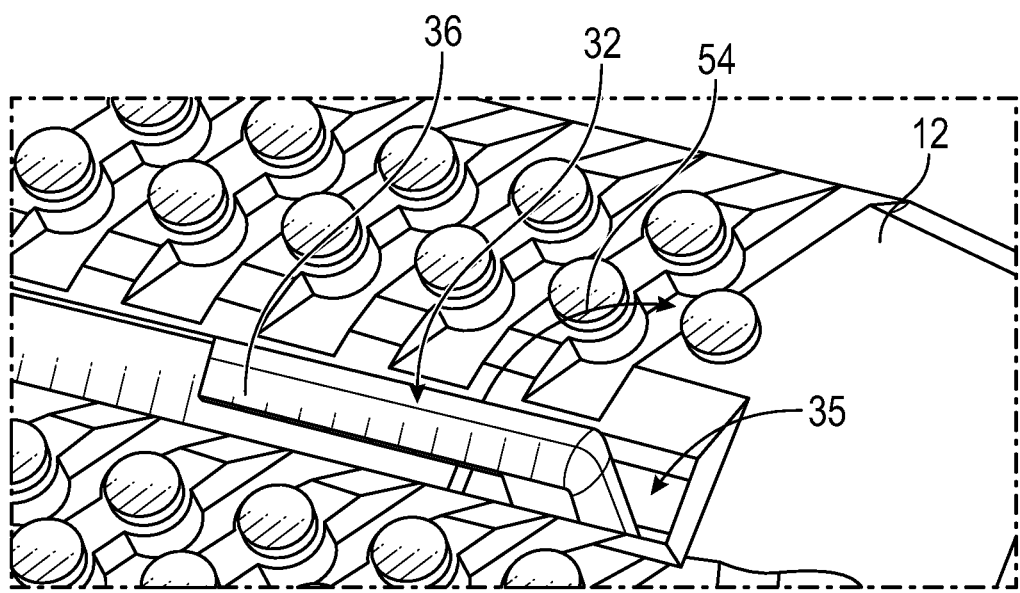
FIGS. 6A, 6B, and 6C schematically illustrate a method of removing the vehicle exterior component of FIG. 1 from the vehicle for using the vehicle exterior component as a sand ladder in the manner depicted in FIG. 2.
Figure 6B:
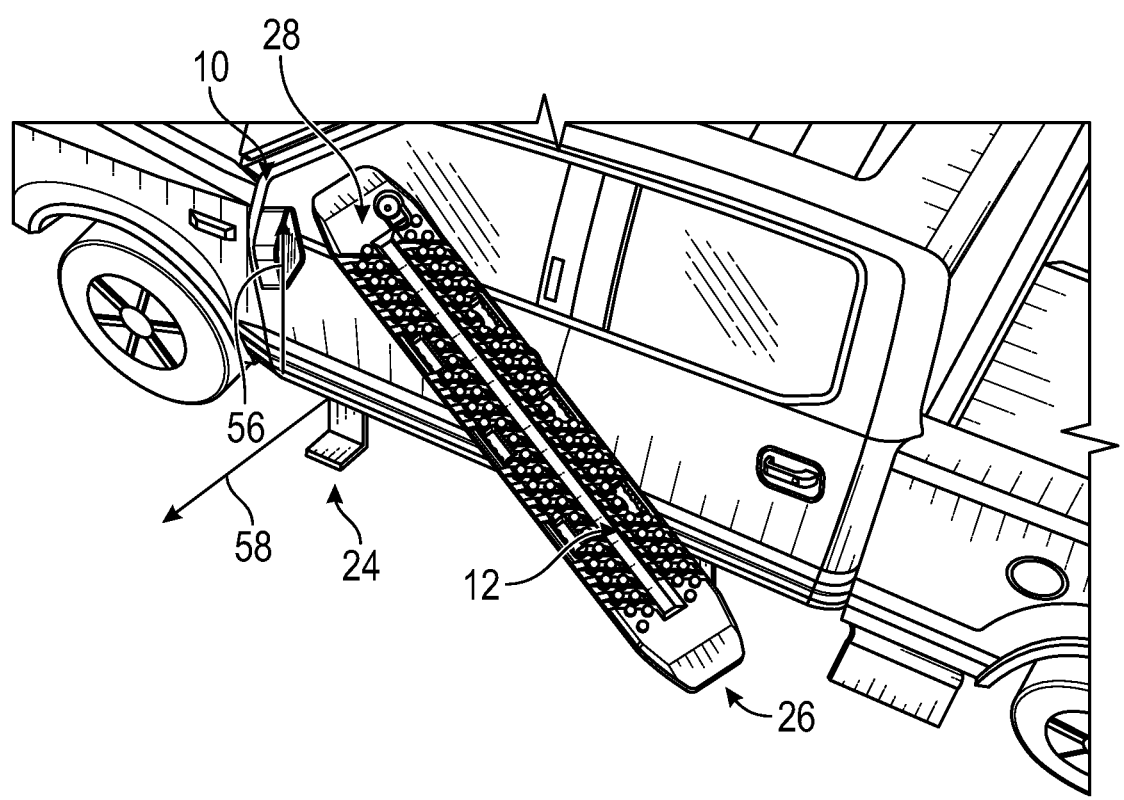
Figure 6C:
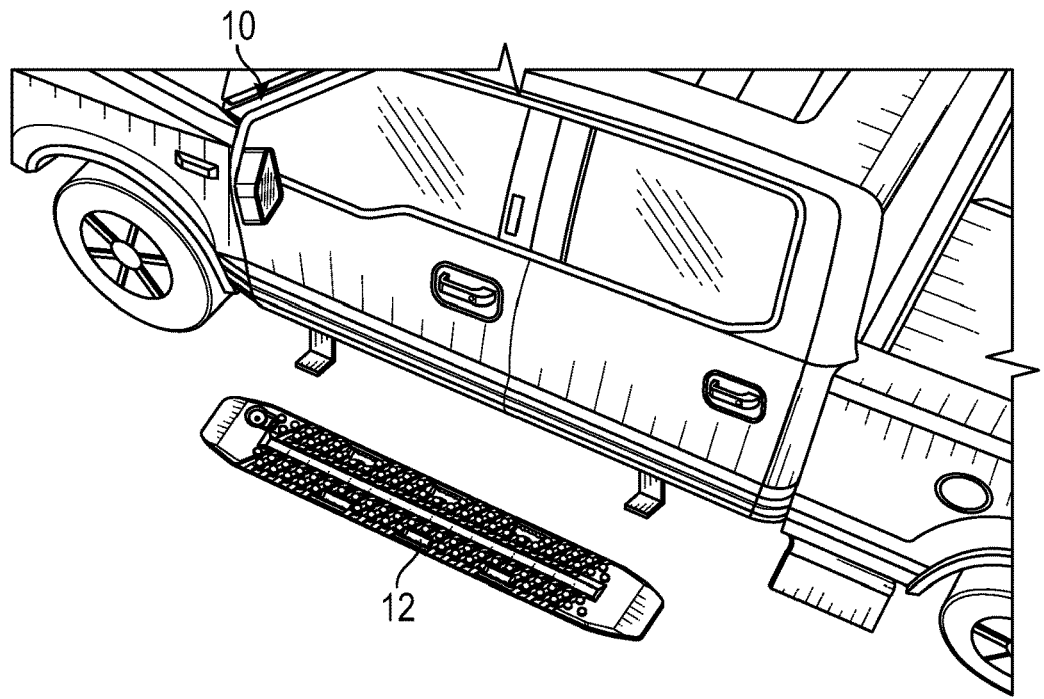

FIGS. 6A, 6B, and 6C, with continued reference to FIGS. 1-5C, schematically illustrate an exemplary method for removing the running board 12 from the vehicle 10 for use in the second configuration C2 as a sand ladder. The following sequence of steps assumes that the running board 12 is secured to the vehicle body 14 when beginning the method. However, the opposite situation is also within the scope of this disclosure in which the running board 12 has just been utilized as a sand ladder when beginning the method and is then re-attached to the vehicle body 14 for positioning the running board 12 in the first configuration C1 for performing its primary function.

Referring first to FIG. 6A, the handle 36 of the clamp 32 may be rotated in the direction of arrow 54 in order to disengage the clamping leg 38 from the mounting bracket 30 of the first mounting assembly 24.

Referring next to FIG. 6B, the first end portion 28 of the running board 12 may be pulled/swung up in the direction of arrow 56 to release the first end portion 28 of the running board 12 from the first mount assembly 24. The running board 12 may then be pulled/swing outwardly in the direction of arrow 58 in order to disengage the post 52 of the mounting bracket 46 from the concave recess 50 of the receiving bracket 48 of the second mounting assembly 26. The running board 12 is then completely disengaged from the mounting system 22 (see FIG. 6C) and may be utilized as a sand ladder in the manner schematically depicted in FIG. 2.

Figure 7:
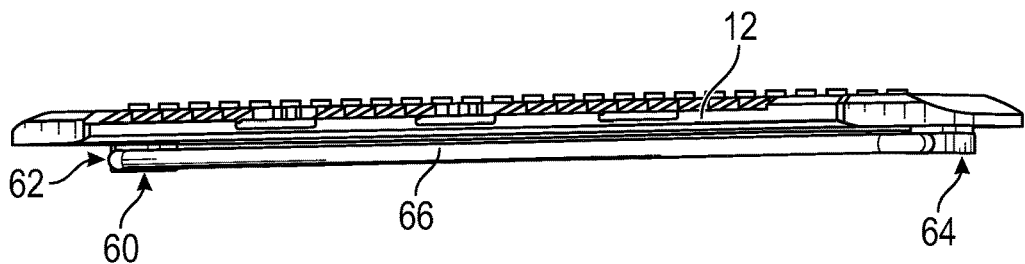
FIG. 7 illustrates another exemplary mounting system for removably mounting the vehicle exterior component of FIG. 1 to the vehicle.
Figure 8A:
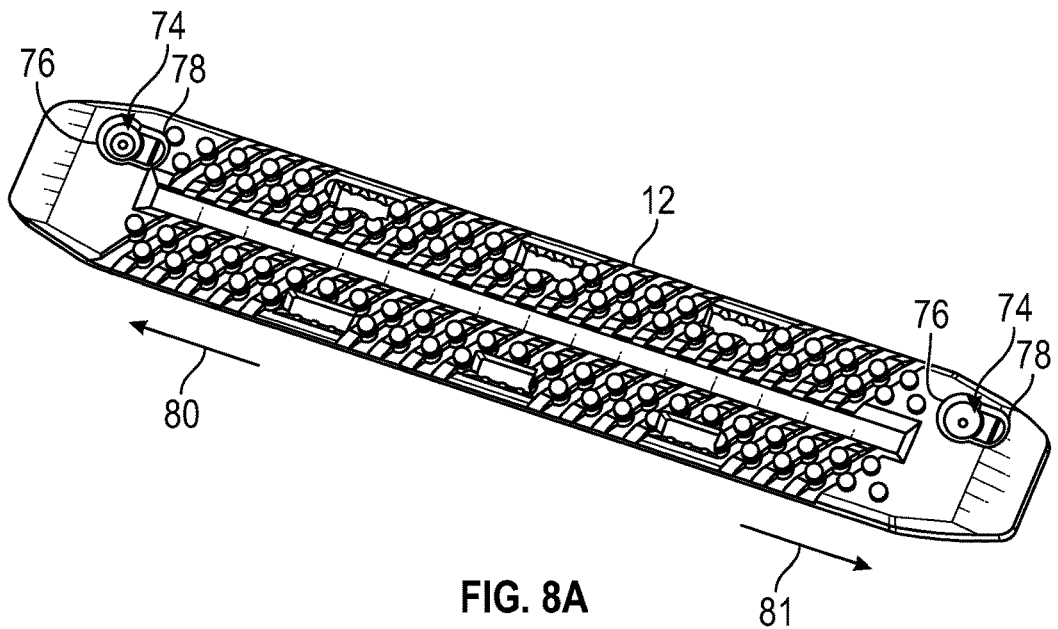
FIGS. 8A and 8B illustrate a mounting assembly of the mounting system of FIG. 7.
Figure 8B:
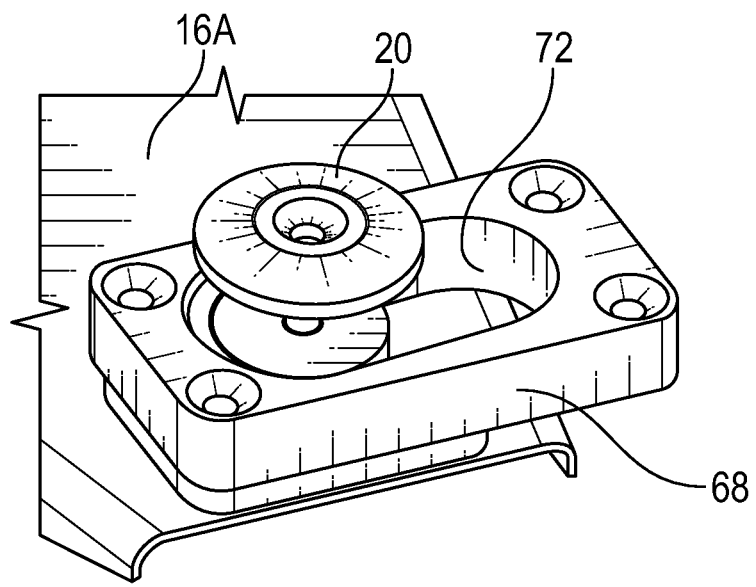

FIGS. 7-8B, with continued reference to FIG. 1, illustrate a mounting system 60 for removably mounting the running board 12 to the vehicle body 14 according to a second embodiment of this disclosure. In addition to the fore and aft brackets 16A, 16B shown in FIG. 1, the mounting system 60 may include a first or front mounting assembly 62, a second or rear mounting assembly 64, and a support rod 66 that connects between the first and second mounting assemblies 62 64.

Each of the first and second mounting assemblies 62, 64 may include a latch base 68 and a latch 70 (see FIG. 8B). The latch base 68 may be fixedly secured to the bracket 16A (or the bracket 16B), and the latch 70 may be secured within a slot 72 of the latch base 68. Portions of the latch 70 may be arranged to protrude outwardly above the slot 72.

The latches 70 may be accommodated within grooves 74 (see FIG. 8A) formed through the running board 12, such as to establish tongue-and-groove connections between the mounting system 60 and the running board 12. Each groove 74 may include a first section 76 having a first width and a second section 78 having a second width that is smaller than first width. The latches 70 may be inserted through the first section 76, and then the running board 12 may be moved in a forward direction 80 to position the latches in the second section 78, thereby securing the running board 12 relative to the vehicle 10. The latches 70 may be moved from the second section 78 to the first section 76 of the grooves 74 by moving the running board 12 in a rearward direction 81 for removing the running board 12 from the vehicle 10 for use as a sand ladder.

Figure 9:
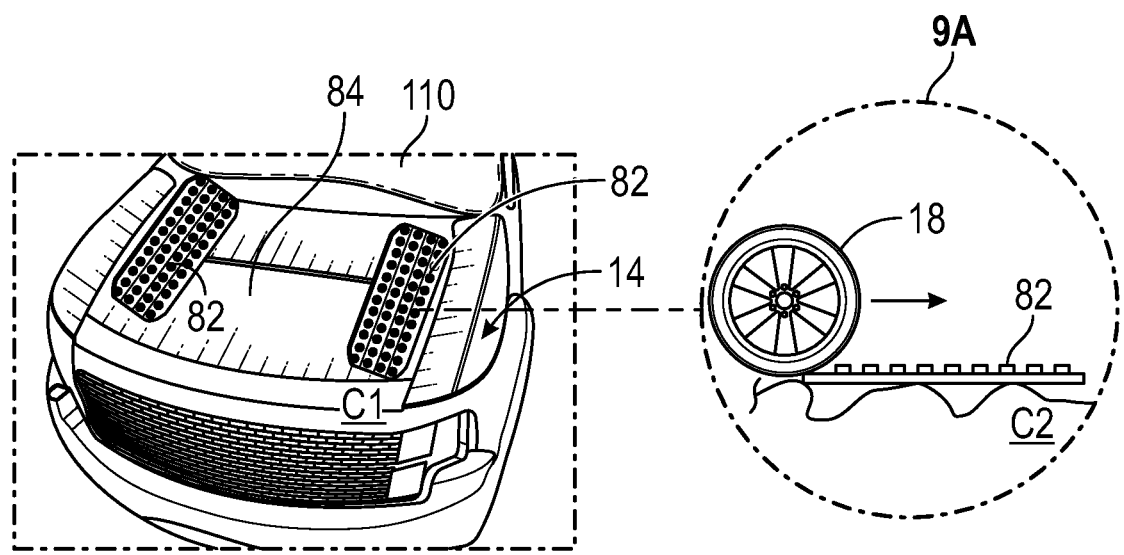
FIG. 9 illustrates another exemplary vehicle equipped with a vehicle exterior component. In a first configuration, the vehicle exterior component is configured as a hood vent, and in a second configuration, the vehicle exterior component is configured to be used as a sand ladder.

FIG. 9 illustrates select portions of another exemplary motor vehicle 110. The vehicle 110 includes one or more hood vents 82, which are another exemplary type of vehicle exterior component contemplated within the scope of this disclosure. Each hood vent 82 may be removably mounted to a hood 84 of the vehicle body 14.

In a first configuration C1, each hood vent 82 is configured for its primary function as part of the hood 84. In a second configuration C2 (see inset 9A), the hood vent 82 is removed from the vehicle body 14 for use as a sand ladder.

Figure 10:
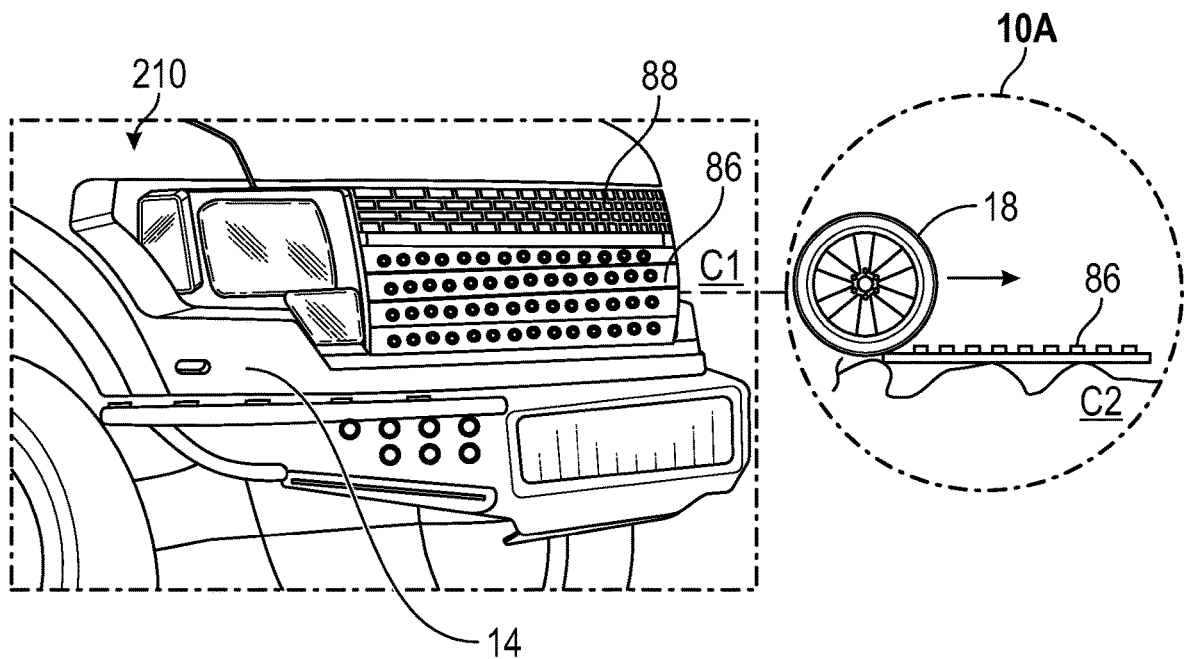
FIG. 10 illustrates another exemplary vehicle equipped with a vehicle exterior component. In a first configuration, the vehicle exterior component is configured as a grille insert, and in a second configuration, the vehicle exterior component is configured to be used as a sand ladder.

FIG. 10 illustrates select portions of another exemplary motor vehicle 210. The vehicle 210 includes one or more grille inserts 86, which are another exemplary type of vehicle exterior component contemplated within the scope of this disclosure. The grille insert 86 may be removably mounted to a grille assembly 88 of the vehicle body 14.

In a first configuration C1, the grille insert 86 is configured for its primary function as part of the grille assembly 88. In a second configuration C2 (see inset 10A), the grille insert 86 is removed from the vehicle body 14 for use as a sand ladder.

Figure 11:
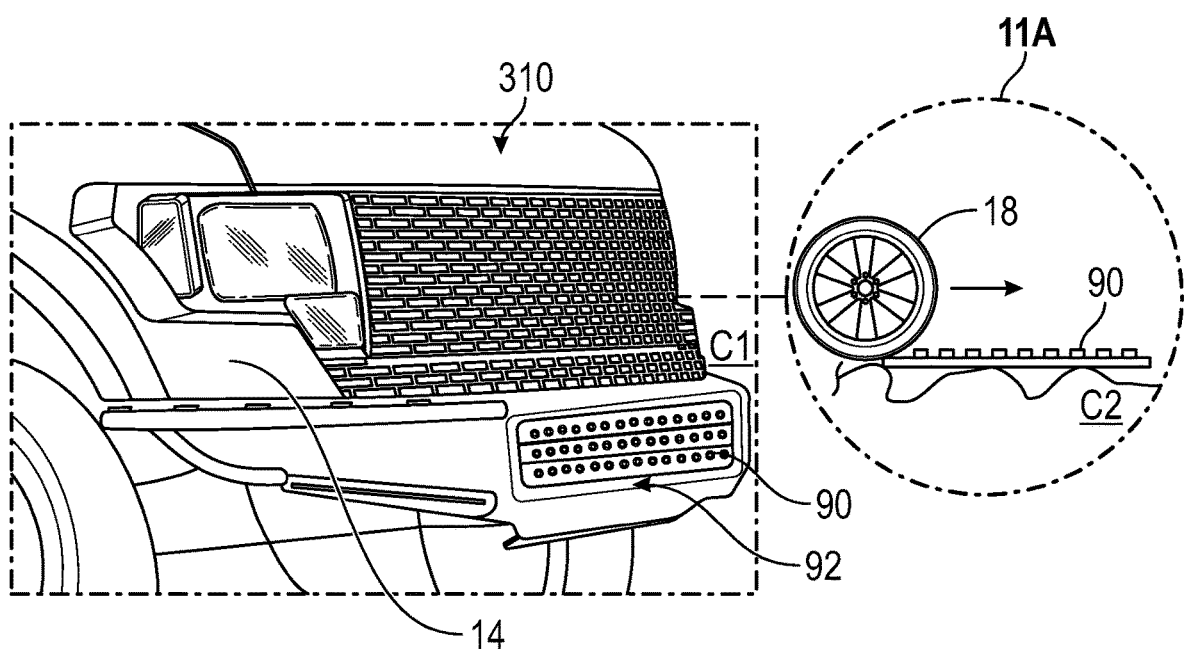
FIG. 11 illustrates another exemplary vehicle equipped with a vehicle exterior component. In a first configuration, the vehicle exterior component is configured as a bumper insert, and in a second configuration, the vehicle exterior component is configured to be used as a sand ladder.

FIG. 11 illustrates select portions of another exemplary motor vehicle 310. The vehicle 310 includes one or more bumper inserts 90, which are another exemplary type of vehicle exterior component contemplated within the scope of this disclosure. The bumper insert 90 may be removably mounted to a bumper assembly 92 of the vehicle body 14.

In a first configuration Cl, the bumper insert 90 is configured for its primary function as part of the bumper assembly 92. In a second configuration C2 (see inset 11A), the bumper insert 90 is removed from the vehicle body 14 for use as a sand ladder.

Figure 12:
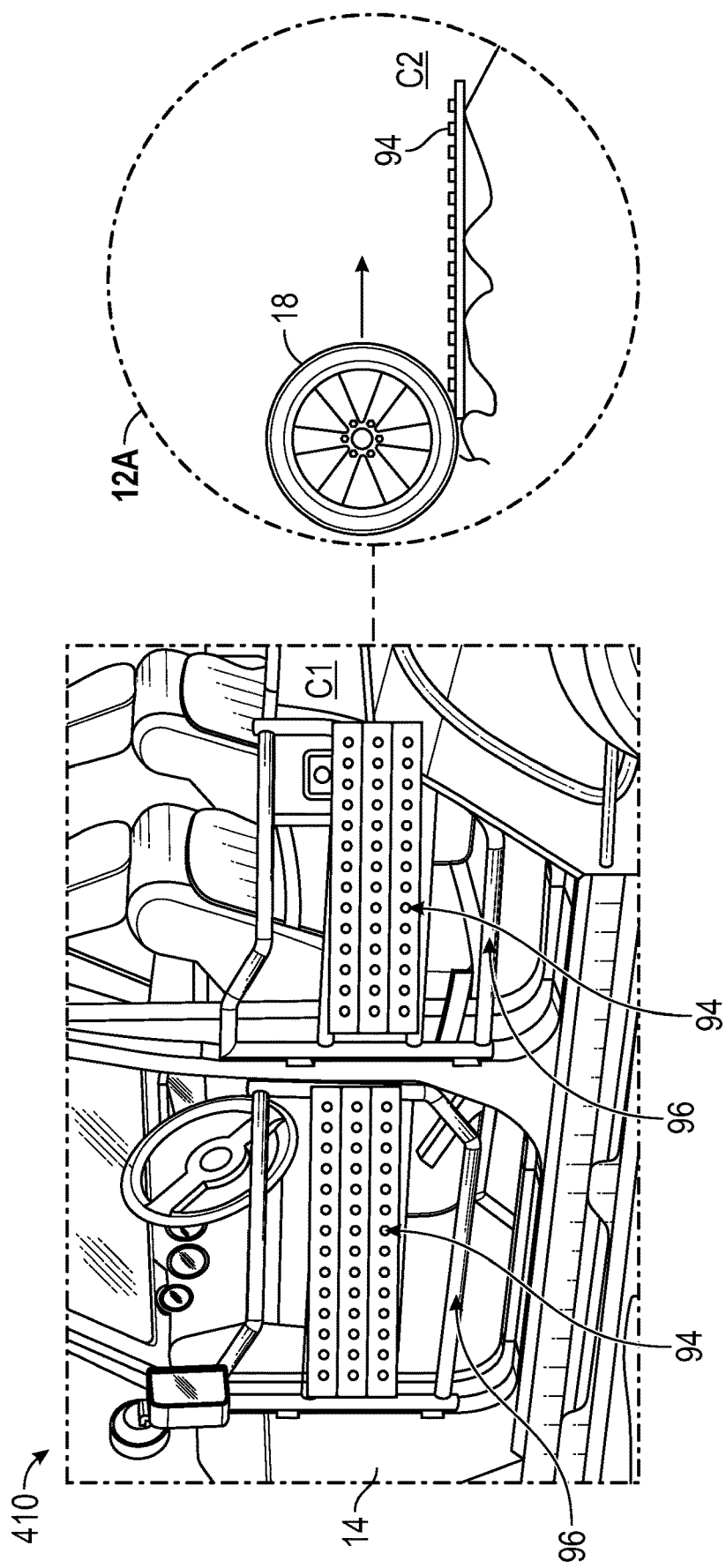
FIG. 12 illustrates another exemplary vehicle equipped with a vehicle exterior component. In a first configuration, the vehicle exterior component is configured as a door beam, and in a second configuration, the vehicle exterior component is configured to be used as a sand ladder.

FIG. 12 illustrates select portions of another exemplary motor vehicle 410. The vehicle 410 includes one or more door beams 94, which are another exemplary type of vehicle exterior component contemplated within the scope of this disclosure. The door beam 94 may be removably mounted to a door assembly 96 of the vehicle body 14.

In a first configuration C1, the door beam 94 is configured for its primary function as part of the door assembly 96. In a second configuration C2 (see inset 12A), the door beam 94 is removed from the vehicle body 14 for use as a sand ladder.

Figure 13:
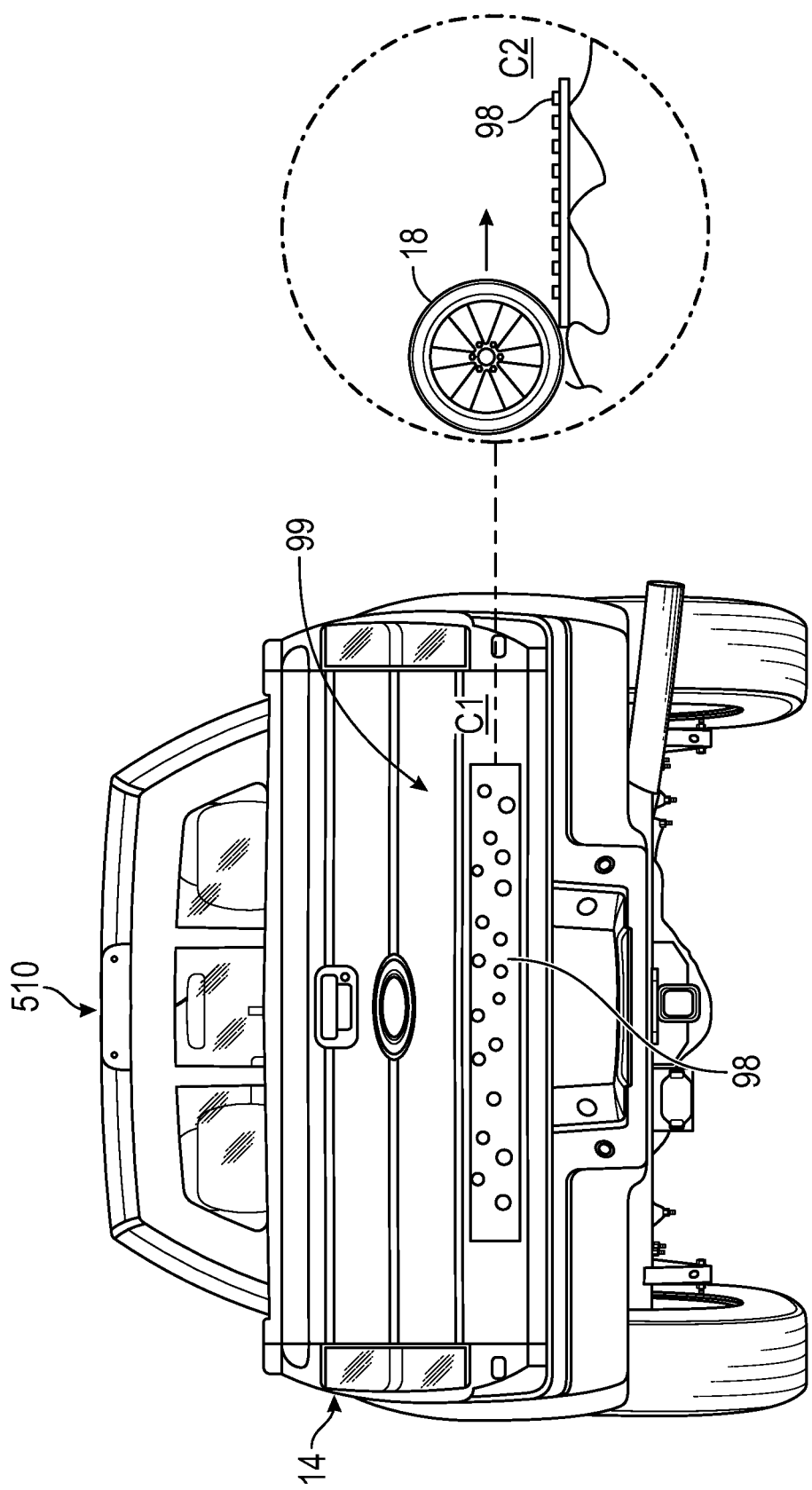
FIG. 13 illustrates yet another exemplary vehicle equipped with a vehicle exterior component. In a first configuration, the vehicle exterior component is configured as a tailgate insert, and in a second configuration, the vehicle exterior component is configured to be used as a sand ladder.

FIG. 13 illustrates select portions of yet another exemplary motor vehicle 510. The vehicle 510 includes one or more tailgate inserts 98, which are yet another exemplary type of vehicle exterior component contemplated within the scope of this disclosure. The tailgate insert 98 may be removably mounted to a tailgate assembly 99 of the vehicle body 14.

In a first configuration Cl, the tailgate insert 98 is configured for its primary function as part of the tailgate assembly 99. In a second configuration C2 (see inset 13A), the tailgate insert 98 is removed from the vehicle body 14 for use as a sand ladder.

The vehicle design integrated exterior components of this disclosure are advantageously configured for both their primary use when attached to the vehicle and for a secondary use as a sand ladder when removed from the vehicle. Leveraging one or more vehicle exterior components for use as a sand ladder saves costs, weight, and valuable storage space within the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle assembly, comprising:
a vehicle exterior component; and
a mounting system configured for removably mounting the vehicle exterior component to a vehicle body,
wherein the mounting system includes a clamp that includes a clamping leg configured to move between a disengaged position and an engaged position relative to a mounting bracket that is mounted to an underside of the vehicle exterior component,
wherein, in a first configuration, the vehicle exterior component is configured as a running board,
wherein, in a second configuration, the vehicle exterior component is configured to be used as a sand ladder.

2. The vehicle assembly as recited in claim 1, wherein the mounting system includes a first mounting assembly that interfaces with a first portion of the vehicle exterior component and a second mounting assembly that interfaces with a second portion of the vehicle exterior component.

3. The vehicle assembly recited in claim 2, wherein the first mounting assembly includes the clamp, and further wherein the clamp is received within an opening formed through the vehicle exterior component.

4. The vehicle assembly as recited in claim 1, wherein the clamping leg is configured to move into contact with the mounting bracket in response to moving a handle of the clamp.

5. The vehicle assembly as recited in claim 2, wherein the second mounting assembly includes a receiving bracket mounted to an underside of the vehicle exterior component.

6. The vehicle assembly as recited in claim 5, wherein the receiving bracket includes a concave recess configured to receive a post of a mounting bracket.

7. The vehicle assembly as recited in claim 1, wherein the vehicle exterior component includes a plurality of traction features.

8. The vehicle assembly as recited in claim 7, wherein the plurality of traction features include a combination of traction pins and grooves.

9. A vehicle assembly, comprising:
a vehicle exterior component; and
a mounting system configured for removably mounting the vehicle exterior component to a vehicle body,
wherein the mounting system includes at least one of a clamp or a latch,
wherein, in a first configuration, the vehicle exterior component is configured as a running board,
wherein, in a second configuration, the vehicle exterior component is configured to be used as a sand ladder,
wherein the mounting system includes the latch, and further wherein the latch is received within a slot of a latch base,
wherein the latch is movably received within a groove formed through the vehicle exterior component,
wherein the groove includes a first section having a first width and a second section having a second width that is less than the first width.

10. The vehicle assembly as recited in claim 1, wherein the clamp is a toggle clamp.

11. The vehicle assembly as recited in claim 1, wherein a boss of the clamping leg is accommodated within a receiving opening of the mounting bracket when in the engaged position.

12. The vehicle assembly as recited in claim 4, wherein the handle extends in a first direction outwardly of a top surface of the vehicle exterior component, and the clamping leg extends in a second opposite direction outwardly of the underside of the vehicle exterior component.

13. The vehicle assembly as recited in claim 12, wherein the handle is rotated outwardly relative to the top surface to position the clamping leg in the disengaged position.

14. The vehicle assembly as recited in claim 6, wherein the mounting bracket is fixedly secured to a bracket that is mounted to the vehicle body.

15. The vehicle assembly as recited in claim 6, wherein the concave recess and the post are oriented at an angle relative to a horizontal axis of the vehicle body.

16. The vehicle assembly as recited in claim 15, wherein the angle is an acute angle.

17. The vehicle assembly as recited in claim 16, wherein the acute angle is about 45 degrees.

18. A vehicle assembly, comprising:
a vehicle exterior component, wherein in a first configuration, the vehicle exterior component is configured as a running board, and in a second configuration, the vehicle exterior component is configured to be used as a sand ladder; and a mounting system configured to removably mount the vehicle exterior component to a vehicle body, wherein the mounting system includes a first mounting assembly, a second mounting assembly, and a support rod that connects between the first mounting assembly and the second mounting assembly, wherein each of the first mounting assembly and the second mounting assembly includes a latch base secured to a bracket that is mounted to the vehicle body, and a latch that is receivable within a groove formed through the vehicle exterior component.

19. The vehicle assembly as recited in claim 18, wherein the support rod extends beneath an underside of the vehicle exterior component, and further wherein the groove opens through both a top surface and the undersurface of the vehicle exterior component.

20. The vehicle assembly as recited in claim 18, wherein the latch protrudes outwardly of a slot of the latch base.

\* \* \* \* \*